US012094669B2

(12) United States Patent
Chen et al.

(10) Patent No.: US 12,094,669 B2
(45) Date of Patent: Sep. 17, 2024

(54) ACTUATOR MOVEMENT DETECTOR FOR MEDIUM AND HIGH VOLTAGE SWITCHES HAVING A PRIMARY ACTUATOR IN SERIES WITH A SECONDARY ACTUATOR

(71) Applicant: EATON INTELLIGENT POWER LIMITED, Dublin (IE)

(72) Inventors: Steven Z. Chen, Coraopolis, PA (US); Andrew L. Gottschalk, Monaca, PA (US); Steven Schmalz, Franklin, WI (US); Andy Schroedermeier, Whitefish Bay, WI (US); Hongbin Wang, Novi, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 261 days.

(21) Appl. No.: 17/858,559

(22) Filed: Jul. 6, 2022

(65) Prior Publication Data

US 2024/0013992 A1 Jan. 11, 2024

(51) Int. Cl.
*H01H 33/59* (2006.01)
*H01H 33/42* (2006.01)

(52) U.S. Cl.
CPC ............ *H01H 33/59* (2013.01); *H01H 33/42* (2013.01)

(58) Field of Classification Search
CPC .... H01H 33/59; H01H 33/42; H01H 11/0062; H01H 33/36; H01H 33/666; H01H 33/6662; H01H 9/542
See application file for complete search history.

(56) References Cited

U.S. PATENT DOCUMENTS

| | | | | |
|---|---|---|---|---|
| 2009/0027146 A1* | 1/2009 | Mills | H01H 71/40 | 335/35 |
| 2015/0015999 A1* | 1/2015 | Relyea | H02H 3/04 | 361/115 |
| 2017/0184674 A1* | 6/2017 | Okerman | G01R 31/327 | |
| 2018/0172767 A1* | 6/2018 | Zhou | H01H 9/54 | |
| 2019/0096598 A1* | 3/2019 | Schmalz | H02H 3/085 | |

* cited by examiner

*Primary Examiner* — Alvaro E Fortich
(74) *Attorney, Agent, or Firm* — Eckert Seamans Cherin & Mellott, LLC

(57) ABSTRACT

For a hybrid circuit interrupter that includes a secondary actuator disposed in series with a primary actuator, with the primary actuator used for opening the switch at ultra-fast speeds and the secondary actuator used for opening the switch at normal speeds, a performance monitoring system is disclosed. The monitoring system can use either an optical sensor or position sensitive device (PSD) to detect movement of the primary actuator. The optical sensor is coupled to the circuit interrupter housing, and a distance detection means is disposed within the secondary actuator in a manner that enables the optical sensor to detect the movement of a reference surface on the moving assembly of the primary actuator. The PSD is positioned to face a thru-hole formed in a drive shaft of the circuit interrupter, and to sense a change in position of light emitted through the thru-hole during an opening stroke.

18 Claims, 6 Drawing Sheets

ACTUATOR MOVEMENT DETECTOR FOR MEDIUM AND HIGH VOLTAGE SWITCHES HAVING A PRIMARY ACTUATOR IN SERIES WITH A SECONDARY ACTUATOR

GOVERNMENT SUPPORT

This invention was made with government support under DE-AR0001111 awarded by the U.S. Department of Energy. The government has certain rights in the invention.

FIELD OF THE INVENTION

The disclosed concept relates generally to circuit interrupters, and in particular, to devices for monitoring the performance of actuators in ultra-fast switches with multiple actuators.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit interrupters typically include mechanically operated separable electrical contacts, which operate as a switch. When the separable contacts are in contact with one another in a closed state, current is able to flow through any circuits connected to the circuit interrupter. When the separable contacts are not in contact with one another in an open state, current is prevented from flowing through any circuits connected to the circuit interrupter. Circuit interrupters typically include an actuator designed to rapidly close or open the separable contacts, and a trip mechanism, such as a trip unit, which senses a number of fault conditions to trip the separable contacts open automatically using the actuator. Upon sensing a fault condition, the trip unit trips the actuator to move the separable contacts to their open position.

Certain power applications require ultra-fast switches, for which hybrid circuit interrupters offer a suitable solution. Hybrid circuit interrupters employ an electronic interrupter in addition to the mechanical separable contacts, which are often components of an ultra-fast vacuum switch. The electronic interrupter comprises electronic components structured to commutate current after a fault is detected. Once current is commutated from the mechanical vacuum switch to the electronic interrupter, the mechanical separable contacts are able to separate with a reduced risk of arcing. Hybrid circuit interrupters are equipped with control logic that causes the electronic interrupter to turn off quickly after current is commutated, in order to fully open the circuit.

Some ultra-fast switching devices include both a primary actuator used for ultra-fast switching applications and a secondary actuator used for normal speed switching applications. Having two actuators enables the primary actuator to only be used in those situations when high-speed opening is truly required, thus extending the life of the device. Ultra-fast switches are generally used in situations with low error tolerance and thus, monitoring the performance of an ultra-fast switch is important for detecting performance degradation as early as possible. However, implementation of a suitable monitoring system in a medium to high voltage circuit interrupter that includes multiple actuators can be challenging due to the need for the monitoring system to be able to withstand the high voltage environment, as well as the physical obstruction of strategic observation points of the primary actuator due to the physical space occupied by the secondary actuator.

There is thus room for improvement within diagnostic monitoring systems for ultra-fast switches in circuit interrupters that include multiple actuators.

SUMMARY OF THE INVENTION

These needs, and others, are met by embodiments of an actuator performance monitoring system structured to monitor the performance of an ultra-fast primary actuator disposed in series with a normal speed secondary actuator in a hybrid circuit interrupter. An actuation shaft of the primary actuator is coupled to the secondary actuator via a mechanism that enables the secondary actuator to remain stationary whenever the primary actuator opens the switch. The actuator performance monitoring system uses either an optical sensor or a position sensitive device to track movement of the primary actuator. If an optical sensor is used, the optical sensor is coupled to the circuit interrupter housing, and a distance detection means is disposed within the secondary actuator in a manner that enables the optical sensor to detect the movement of a reference surface on the moving assembly of the primary actuator. The movement of the reference surface on the primary actuator is considered to be a proxy for the movement of a moving separable contact of the switch. If a position sensitive device is used, then a thru-hole is formed in a drive shaft of the circuit interrupter, a light source is positioned to face one end of the thru-hole, and a position sensing device is positioned to face a second end of the thru-hole disposed opposite the first end. The movement of the thru-hole on the drive shaft is considered to be a proxy for the movement of a moving separable contact of the switch. The disclosed actuator performance monitoring system embodiments inherently mitigate the risk of compromising the dielectric integrity between vacuum interrupter terminals and the rest of the circuit breaker mechanism by only introducing sensor interfaces in sections of the circuit breaker mechanism that normally are ground referenced.

In accordance with one aspect of the disclosed concept, an actuator performance monitoring system for a circuit interrupter comprises: an optical sensor, a distance detection means, and a processor in electrical communication with the optical sensor. The circuit interrupter comprises a primary actuator and a secondary actuator each being structured to open mechanical separable contacts of the circuit interrupter, the primary actuator being disposed in series with the secondary actuator such that the primary actuator is disposed between the secondary actuator and the mechanical separable contacts. The optical sensor is fixedly positioned relative to a housing of the circuit interrupter. The distance detection means is disposed within the interior of the secondary actuator and structured to enable the optical sensor to determine the distance that a reference surface on the primary actuator travels during movement of the primary actuator. The primary actuator, the secondary actuator, and the optical sensor are all referenced to the same voltage.

In accordance with another aspect of the disclosed concept, a hybrid circuit interrupter comprises: a housing, a line conductor structured to connect a load to a power source, a hybrid switch assembly comprising mechanical separable contacts and an electronic interrupter disposed between the power source and the load, a primary actuator structured to open the mechanical separable contacts at ultra-fast speeds, and an actuator performance monitoring system structured to monitor performance of the primary actuator. The mechanical separable contacts are structured to move between a closed state and an open state, and the electronic interrupter is structured to commutate current when a fault is detected on the line conductor. The actuator performance monitoring system comprises: a light source facing the drive shaft and fixedly positioned relative to the housing; a position sensitive device comprising a sensing surface structured to sense incident light, the sensing surface being positioned to face the drive shaft and the position sensitive device being fixedly positioned relative to the housing; a shade enclosure fixedly positioned relative to the housing and positioned to shield the sensing surface from ambient light; and a processor in electrical communication with the position sensitive device. The drive shaft comprises a thru-hole, and the light source faces a first end of the thru-hole. The sensing surface of the position sensitive device faces a second end of the thru-hole disposed opposite the first end such that any light emitted from the light source and passing through the thru-hole will be incident to the sensing surface. The processor is configured to determine the displacement of the thru-hole resulting from movement of the drive shaft, based on the light passing through the thru-hole and incident to the sensing surface.

In accordance with another aspect of the disclosed concept, a circuit interrupter comprises: a housing, a line conductor structured to connect a load to a power source, mechanical separable contacts disposed along the line conductor and structured to move between a closed state and an open state, a Thomson coil primary actuator structured to open the mechanical separable contacts at ultra-fast speeds, a solenoid secondary actuator disposed in series with the primary actuator and structured to open the mechanical separable contacts at normal speeds, an electronic trip unit structured to monitor the line conductor for fault conditions and selectively actuate the primary actuator and the secondary actuator, and an actuator performance monitoring system structured to monitor performance of the primary actuator. The primary actuator comprises a Thomson coil, a conductive plate structured to be actuated by the Thomson coil, an actuator shaft fixedly coupled to the conductor plate, and a sliding pin fixedly coupled to the actuator shaft. The secondary actuator comprises a solenoid plunger. The actuator performance monitoring system comprises an optical sensor fixedly positioned relative to the housing, a distance detection means disposed within the interior of the solenoid plunger and structured to enable the optical sensor to determine the distance that a reference surface on the primary actuator travels during movement of the primary actuator, and a processor in electrical communication with the optical sensor.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
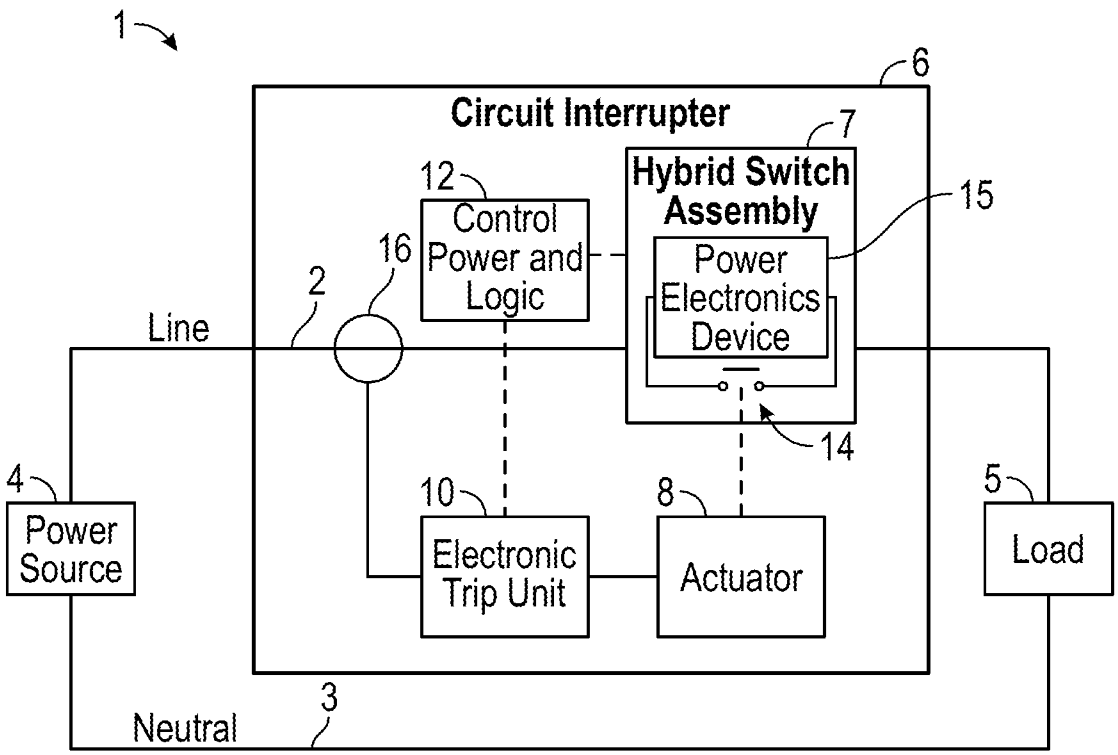
FIG. 1 is a schematic diagram of hybrid circuit interrupter.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "processing unit" or "processor" shall mean a programmable analog and/or digital device that can store, retrieve, and process data; a microprocessor; a microcontroller; a microcomputer; a central processing unit; or any suitable processing device or apparatus.

FIG. 1 is a schematic diagram of a hybrid circuit interrupter 1 (e.g., without limitation, a circuit breaker), in accordance with an example embodiment of the disclosed concept. The circuit interrupter 1 includes a line conductor 2 and a neutral conductor 3 structured to electrically connect a power source 4 to a load 5. The circuit interrupter 1 is structured to trip open to interrupt current flowing between the power source 4 and load 5 in the event of a fault condition (e.g., without limitation, an overcurrent condition).

The circuit interrupter 1 further includes a housing 6, a hybrid switch assembly 7, an actuator 8, an electronic trip unit 10, and a control power and logic module 12 (referred to hereinafter as "control module 12" for brevity) in electrical communication with the trip unit 10. The hybrid switch assembly 7 comprises a set of mechanical separable contacts 14 and a power electronics device that serves as an electronic interrupter 15. In an exemplary embodiment of the disclosed concept, the mechanical contacts 14 are the stationary and moving contacts of a vacuum interrupter 20 (a vacuum interrupter 20 being shown in FIG. 2). When the mechanical contacts 14 are in a closed state such that they are in contact with one another, current flows through the line conductor 2 and the mechanical contacts 14 to the load 5. The hybrid switch assembly 7 is configured such that, when the mechanical contacts 14 are closed, current does not flow through the electronic interrupter 15 and the electronic interrupter 15 is powered off.

The electronic trip unit 10 is structured to monitor power flowing through the circuit interrupter 1 via a current sensor 16 and/or other sensors and to detect fault conditions based on the power flowing through the circuit interrupter 1. In response to detecting a fault condition, the electronic trip unit 10 is configured to: (1) notify the control module 12 of the fault, so that the control module 12 can commutate the current from the mechanical contacts to the electronic interrupter 15, and (2) output a signal to the actuator 8 to cause the actuator 8 to open the mechanical contacts 14 rapidly so that current cannot reflow through the mechanical contacts 14 after current is interrupted by the electronic interrupter 15. It should be noted that the act of the mechanical contacts 14 separating is also referred to herein as an "opening stroke", and that the space formed between the mechanical contacts 14 after the mechanical contacts 14 are separated is referred to herein as a "contact gap".

When current is commutated to the electronic interrupter 15, the control module 12 is configured to execute a tripping sequence that allows the electronic interrupter 15 to remain powered on for only a short prescribed interval of time and to deactivate the electronic interrupter 15 after the prescribed interval of time, such that the line connection between the power source 4 and the load 5 is broken shortly after the current is commutated, in order to reduce the effects of arcing. Limiting the interval of time during which current can flow through the electronic interrupter 15 is important, as the electronic interrupter 15 comprises a number of components that are not intended to withstand sustained continuous current flow. It should be noted that the schematic hybrid switch assembly 7 in FIG. 1 is a simplified depiction of a hybrid switch intended to demonstrate how current commutates past mechanical contacts 14 in a hybrid switch, and is not intended to be limiting on the different types of hybrid switch assemblies that can be included in the circuit interrupter 1.

Figure 2:
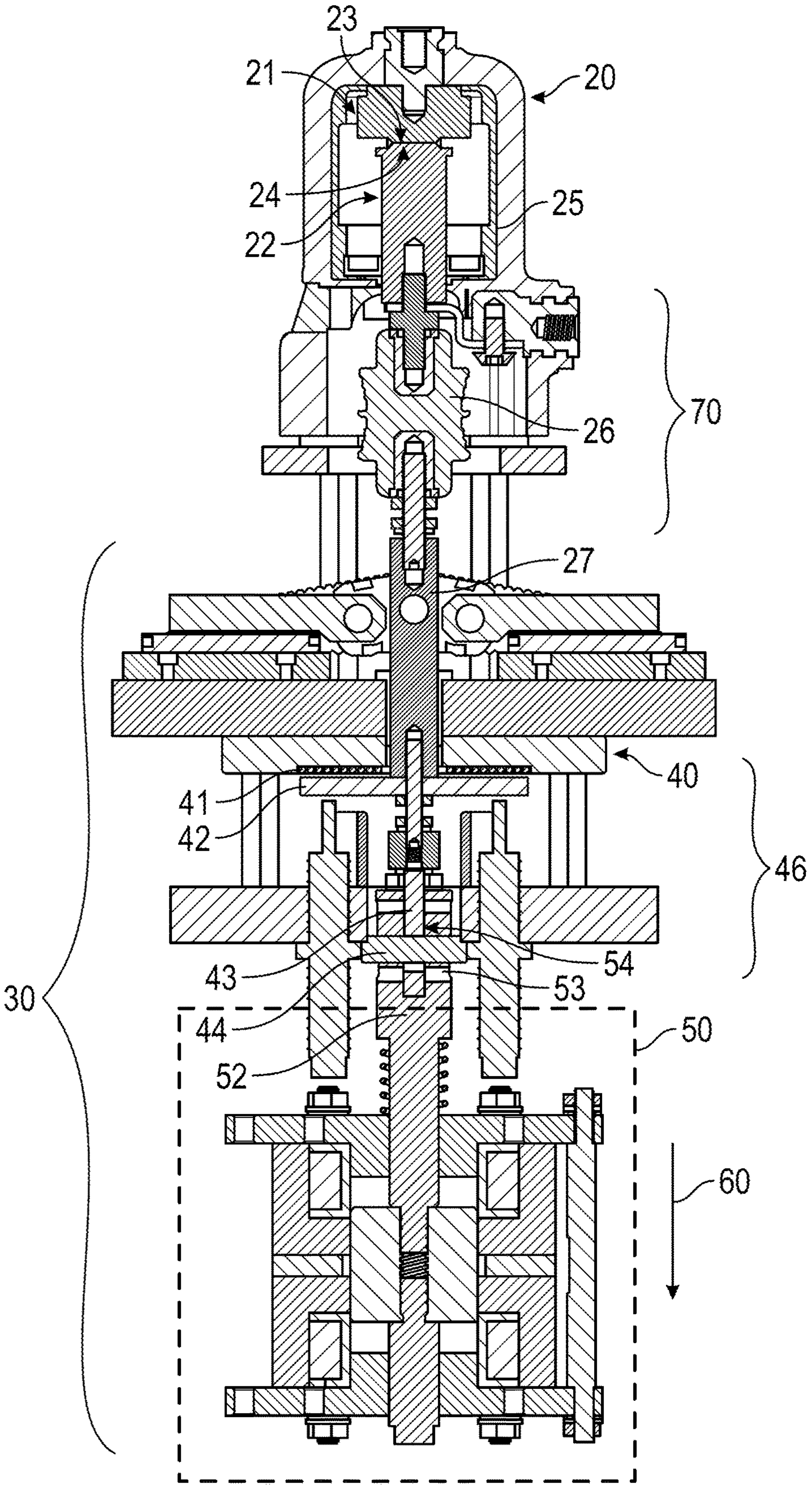
FIG. 2 is a front sectional view of a portion of a hybrid circuit interrupter such as the circuit interrupter schematically depicted in FIG. 1, including a primary actuator and a secondary actuator in series with the primary actuator, in accordance with an example embodiment of the disclosed concept.

FIG. 2 is a front sectional view of a portion of a hybrid circuit interrupter, such as the circuit interrupter 1 schematically depicted in FIG. 1, that comprises a primary actuator in series with a second actuator, in accordance with an exemplary embodiment of the disclosed concept. In FIG. 2, a vacuum interrupter 20 comprising a stationary conductor 21 and a moving conductor 22 is shown. The stationary conductor 21 comprises a stationary contact 23 and the moving conductor 22 comprises a moving contact 24, and it will be appreciated that that stationary and moving contacts 23 and 24 comprise the mechanical separable contacts 14 schematically depicted in FIG. 1. The stationary conductor 21 and the portion of the moving conductor 22 comprising the moving contact 24 are enclosed within a vacuum housing 25. The moving conductor 22 is operably coupled to a drive shaft 27 via an isolation coupling 26. The drive shaft 27 is further operatively coupled to both a primary actuator 40 and a secondary actuator 50. The primary and secondary actuators 40, 50 collectively comprise the actuator 10 schematically depicted in FIG. 1. The drive shaft 27, primary actuator 40, and secondary actuator 50 can be collectively referred to as the mechanism assembly 30.

It should be noted that, as used herein to describe any component or portion of the circuit interrupter 1, the term "proximal" refers to an end of the component or portion disposed closest to the stationary conductor 21 and the term "distal" refers to an end of the component or portion disposed furthest away from the stationary conductor 21. In addition, the terms "proximal[ly]" and "distal[ly]" can be used to describe a disposition or direction of one component relative to another, using the stationary conductor 21 as a reference point. For example and without limitation, the secondary actuator 50 can be said to be disposed distally relative to the primary actuator 40, and the primary actuator can be said to be disposed proximally relative to the secondary actuator 50.

The primary actuator 40 is structured to separate the mechanical contacts 23, 24 at ultra-fast speeds, while the secondary actuator 50 is structured to open the mechanical contacts 23, 24 at normal speeds. The parameters of ultra-fast and normal speed operations are detailed later herein. In FIG. 2, the circuit interrupter 1 is shown in a closed state in which the mechanical contacts 23, 24 are closed. Separation of the mechanical contacts is achieved by driving the moving conductor 22 in the opening direction 60 (i.e. "opening" the moving conductor 22), using either the primary actuator 40 or the secondary actuator 50. When either the primary actuator 40 or secondary actuator 50 is activated for an opening operation, at least a portion of the mechanism assembly 30 moves in the opening direction 60 in order to drive the moving conductor 22 away from the stationary conductor 21.

Figure 3:
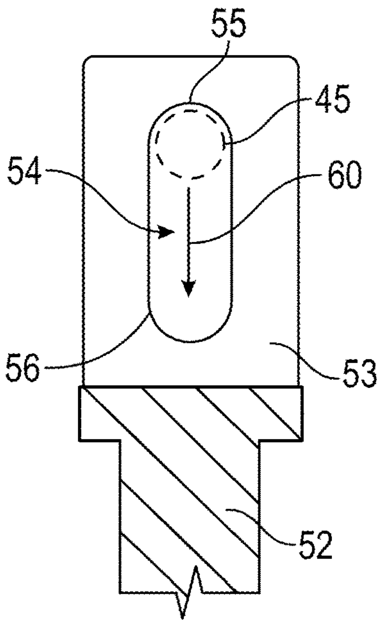
FIG. 3 shows an enlarged sectional view of a portion of a solenoid actuator used to couple the solenoid actuator to a Thomson coil actuator shaft, as shown in FIG. 2.

The primary actuator 40 shown in FIG. 2 is a Thomson coil actuator comprising a Thomson coil 41, a conductive plate 42, a Thomson coil actuator shaft 43, and a sliding pin 44. The Thomson coil 41 remains fixed in place relative to the housing 6 of the circuit interrupter 1 at all times, while the conductive plate 42, the actuator shaft 43, and the sliding pin 44 are all fixedly coupled to one another and to the drive shaft 27, and are structured to move as a unit when actuated. Accordingly, the conductive plate, 42, the actuator shaft 43, and the sliding pin 44 can be collectively referred to as the primary actuator moving assembly 46. The secondary actuator 50 is a solenoid actuator that includes a solenoid plunger 52 comprising an actuating shaft coupler 53. As shown in FIG. 3, the actuating shaft coupler 53 comprises a slot 54, the slot 54 being structured to receive a protrusion 45 of the primary actuator sliding pin 44 (a cross-section of the protrusion 45 is shown in phantom line in FIG. 3), in order to movably couple the sliding pin 44 to the actuating shaft coupler 53. It will be appreciated that the protrusion 45 of the sliding pin 44 extends in a direction perpendicular to the view shown in FIGS. 2 and 3, i.e. into the page. It will be further appreciated that, in the sectional view shown in FIG. 2, the solenoid slot 54 and the protruding portion 45 of the sliding pin 44 are not visible, as they are disposed behind the visible portion of the sliding pin 44.

Still referring to FIG. 3 in conjunction with FIG. 2, it should be noted that the structure of the sliding pin 44 and the solenoid slot 54 enable the secondary actuator 50 to remain fixed in place when the primary actuator moving assembly 46 opens during an ultra-fast opening stroke. The solenoid slot 54 comprises a proximal edge 55 and a distal edge 56 disposed opposite the proximal edge 55. The protrusion 45 of the sliding pin 44 is depicted in its closed state position in FIG. 3, in which the protrusion 45 is adjacent to (i.e. touching) the proximal edge 55 of the solenoid slot 54. When an opening stroke is actuated by the primary actuator 40, as the primary actuator moving assembly 46 moves to its open state, the protrusion 45 moves in the opening direction 60 within the solenoid slot 54 until the protrusion 45 is adjacent to the distal edge 56 of the solenoid slot 54 at the end of the opening stroke. Thus, when the primary actuator 40 drives the moving conductor 22 to open during an opening stroke, the secondary actuator 50 remains fixed in place. The protrusion 45 is said to be in its open state when it is disposed adjacent to the distal edge 56 of the solenoid slot 54.

Consistency in the timing of the opening operations of the ultra-fast vacuum switch 20 is critical to the success of the hybrid circuit breaker in commutating and interrupting current flow. Thus, there is a need for continuous monitoring and frequent verification of performance of the primary actuator 40. Specifically, it is important to be able to identify the moment of contact parting (i.e. separation of the mechanical contacts 23, 24) during an opening stroke and to monitor and capture the travel curve of the moving contact 24. As used herein, the term "opening time" refers to the amount of time it takes for the mechanical contacts 14 to start to separate after the actuator 8 receives an opening command from the trip unit 10. As used herein, the term "response time" refers to the time it takes for the moving contact 24 to move a specified distance away from the stationary contact 22 after the actuator 8 receives an opening command from the trip unit 10.

Identifying the moment of contact parting is important for determining opening time, and monitoring the travel curve of the moving contact 24 is important for determining response time. A typical conventional medium voltage (MV) circuit breaker has a relatively large opening stroke of 10-20 mm and a relatively slow response time of >40 ms with relaxed tolerances, and the secondary actuator 50 is designed to open the mechanical contacts 23, 24 at these specifications, i.e. at normal speeds. By comparison, an ultra-fast opening stroke initiated by the primary actuator 40 is very small (<1-2 mm) and the primary actuator 40 has a very short response time (<500 μS) with strict tolerances (±0.5 mm for the opening stroke contact gap, ±25 μS for the opening stroke response time).

It will be appreciated that the travel of the moving contact 24 during an opening stroke actuated by the primary actuator 40 is a good indicator of the ultra-fast performance of the hybrid interrupter 1. However, monitoring the movement of the moving contact 24 presents several design challenges. Due to space constraints and the electrical environment within the vacuum housing 25, it would be difficult to design a sensor system suitable for placement within the vacuum housing 25 in order to directly observe the movement of the moving contact 24 during an opening stroke. For instance, a wired connection between either of the mechanical contacts 23, 24 and a sensor would need to be capable of withstanding a minimum voltage surge of 24 kV. In addition, the dielectric integrity between the interrupter terminals connected to the mechanical contacts 23, 24 must be maintained, so a sensor system implemented in the vacuum housing 25 would need be suitable for use in a minimum 24 kV floating voltage environment.

Thus, a better option for monitoring the movement of the moving contact 24 is to use a sensor to monitor movement of some other component (i.e. a component other than moving contact 24) that also moves during an ultra-fast opening stroke, with the movement of the other component serving as a proxy for the movement of the moving contact 24. No components of the secondary actuator 50 can be used for this purpose, since the secondary actuator 50 is structured such that it does not move when the primary actuator 40 actuates an opening stroke, as previously described with respect to FIG. 3. The component also should not be chosen from the mechanical linkage portion 70 (FIG. 2) of the circuit interrupter 1, as there are multiple joints forming a mechanical link between the moving conductor 22 and the primary actuator 40 in this linkage portion 70, and if a movement sensor were to be used to observe the movement of a component in the linkage portion 70, the nature of the elasticity and friction of the mechanical link would likely cause variation in measurement results and misrepresentation of the movement of moving contact 24, especially under sudden and high pulsive force. An additional consideration to be taken into account is that the physical space occupied by the secondary actuator 50 prevents the use of a laser displacement sensor for observing the movement of the primary actuator 40.

Referring now to FIGS. 4, 5, and 6A-6C, the present disclosure introduces three embodiments of an actuator movement detector for monitoring circuit interrupter actuator performance during ultra-fast opening operations that address the challenges discussed above. A reference surface 47 of the primary actuator moving assembly 46 is labeled in FIGS. 4 and 5, and the actuator movement detector embodiments 100 and 200 shown in FIGS. 4 and 5 observe the reference surface 47 or use the reference surface 47 as a reference point for movement of the moving contact 24 during ultra-fast opening strokes. While the embodiment 300 shown in FIGS. 6A-6C does not use the reference surface 47 as a reference point for moving of the moving contact 24, the embodiment 300 does include a thru-hole 302 that is formed in the drive shaft 27 and is analogous to the reference surface 47, as the thru-hole 302 serves as a reference point for movement of the moving contact 24, as detailed further herein in relation to FIGS. 6A-6C. Because the moving assembly 46 drives the movement of the moving contact 24 during an ultra-fast opening stroke, the movement of the reference surface 47 is a suitable proxy for the movement of the moving contact 24 during an ultra-fast opening stroke 24, and thus can be used to monitor the response time of the primary actuator 40 and the contact gap created during an ultra-fast opening stroke.

It will be appreciated that, due to the components of the primary actuator moving assembly 46 being fixedly coupled to one another and to the drive shaft 27, the movement of the primary actuator moving assembly 46 during an opening stroke is directly translated into movement of the moving contact 24 during an opening stroke. Accordingly, the moving contact 24 moves the same distance that the reference surface 47 moves during an opening stroke, on a slight delay. Unlike the multiple joints that lead to noticeable elasticity and friction in the mechanical linkage portion 70, the primary actuator moving assembly 46 lacks any significant elasticity or friction that could distort the representation of how far or how quickly the moving contact 24 moves during an opening stroke. As detailed further hereinafter, both the embodiment shown in FIG. 4 and the embodiment shown in FIG. 5 include an optical sensor and a distance detection means, with the distance detection means being structured to enable the optical sensor to determine the distance that the reference surface 47 on the primary actuator moving assembly 46 travels during an opening stroke.

Figure 4:
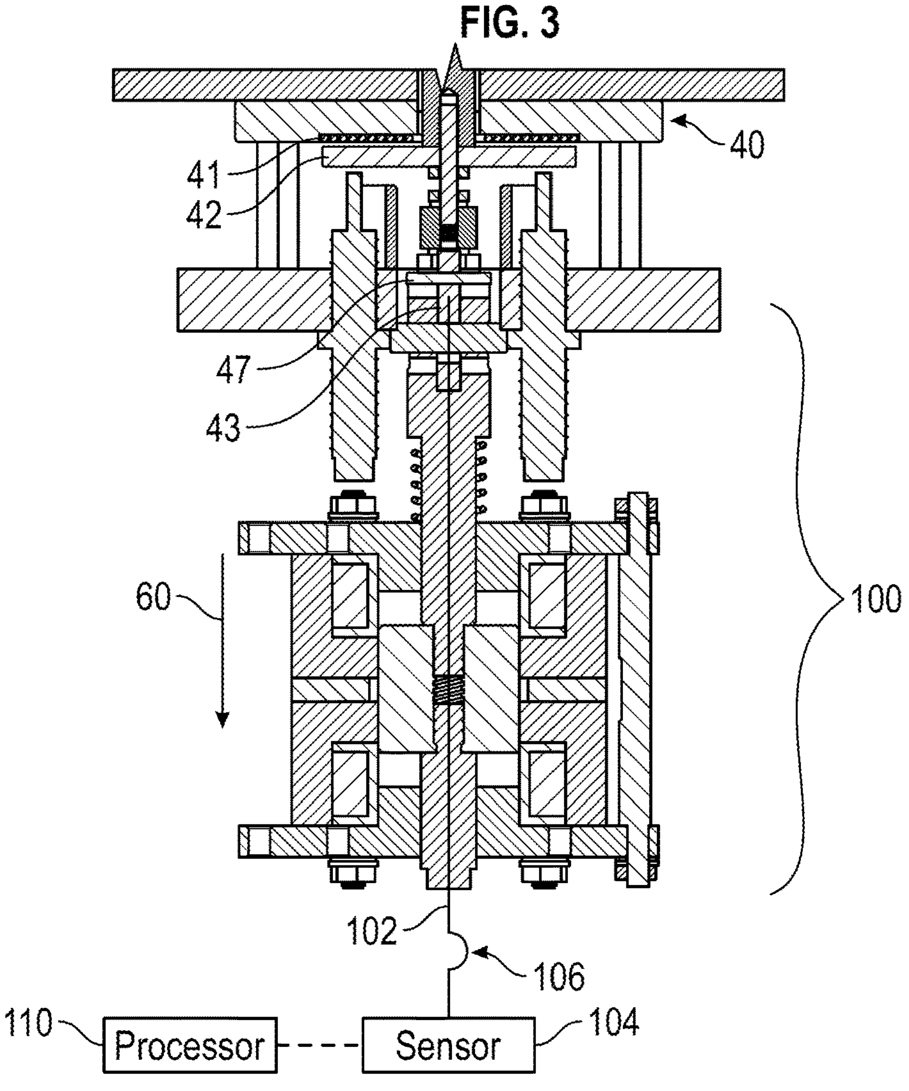
FIG. 4 shows a portion of the sectional view of FIG. 2 with an optical fiber-based system included for monitoring performance of the primary actuator shown in FIG. 2, in accordance with an example embodiment of the disclosed concept.

Referring now to FIG. 4, an optical fiber-based monitoring system 100 for monitoring the performance of the primary actuator 40 during ultra-fast opening operations is shown, in accordance with an exemplary embodiment of the disclosed concept. The actuator movement detector 100 comprises an optical fiber 102, an optical sensor 104 connected to the optical fiber 102, and a processor 110 in electrical communication with the optical sensor 104. The optical fiber 102 is the distance detection means of this embodiment. The optical fiber 102 is embedded within an opening formed in the interior of the solenoid plunger 52 of the secondary actuator 50. This interior opening of the solenoid plunger 52 extends from the proximal end of the plunger 52 to the distal end of the plunger 52 such that the proximal end of the optical fiber 102 faces the reference surface 47 and such that the distal end of the optical fiber 102 extends outside of the distal end of the solenoid plunger 52 and connects to the optical sensor 104. Disposing the proximal end of the optical fiber 102 to face the reference surface 47 enables the optical sensor 104 to detect the distance between the proximal end of the optical fiber 102 and the reference surface 47 at any time. The optical sensor 104 is fixed in place and can be coupled to any portion of the circuit interrupter 1 that remains fixed in place, for example and without limitation, the housing 6 or a frame. As shown in FIG. 4, the length of the optical fiber 102 is chosen in order to provide slack 106 that can accommodate movement of the optical fiber 102 along with the solenoid plunger 52 when the secondary actuator 50 is used to actuate opening or closing of the moving conductor 22 during reset or normal speed opening/closing operations. The processor 110 and optical sensor 104 are in electrical communication such that the processor 110 can monitor the data sensed by the optical sensor 104. It will be appreciated that, because the secondary actuator 50 is structured to remain fixed in place when an ultra-fast opening stroke is actuated, embedding the optical fiber 102 within the solenoid plunger 52 enables the processor 110 to detect the change in position of the reference surface 47 relative to the proximal end of the optical fiber 102 from the beginning of an ultra-fast opening stroke to the end by monitoring the optical sensor 104.

Figure 5:
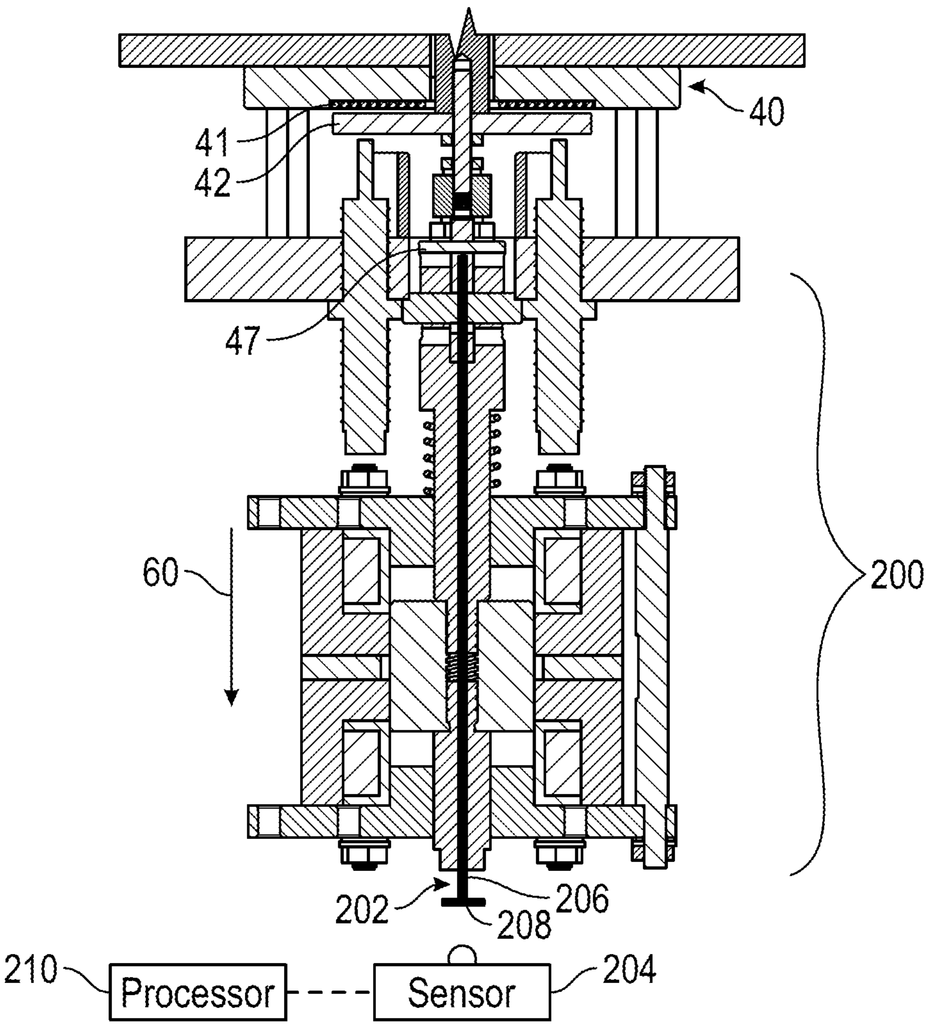
FIG. 5 shows a portion of the sectional view of FIG. 2 with a movement indication bar-based system included for monitoring performance of the primary actuator shown in FIG. 2, in accordance with another example embodiment of the disclosed concept.

Referring now to FIG. 5, a movement indication bar-based monitoring system 200 for monitoring the performance of the primary actuator 40 during ultra-fast opening operations is shown, in accordance with another exemplary embodiment of the disclosed concept. The actuator movement detector 200 comprises a movement indication bar 202, an optical sensor 204, and a processor 210 in electrical communication with the optical sensor 204. The movement indication bar 202 is the distance detection means of this embodiment, designed to be very lightweight, and can be produced from any plastic or low mass metal suitable for use within the electrical conditions of a medium or high voltage circuit interrupter. The movement indication bar 202 is disposed through an opening formed in the interior of the solenoid plunger 52 and is fixedly coupled at a proximal end to the primary actuator moving assembly 46 at the reference surface 47.

The interior opening of the solenoid plunger 52 extends from the proximal end of the plunger 52 to the distal end of the plunger 52. The movement indication bar 202 comprises a body 206 and a distal end 208 integrally formed at the distal end of the bar body 206. The bar body 206 is longer than the length of the solenoid plunger interior opening such that distal end of the bar body 206 extends outside of the plunger interior opening beyond the distal end of the plunger 52. To ensure that the optical sensor 204 can easily detect the presence of the movement indication bar 202, the bar distal end 208 is formed as a linear member or a planar surface disposed perpendicularly to the bar body 206.

The opening in the interior of the solenoid plunger 52 is structured to enable the movement indication bar 202 to move freely in the opening direction 60 along with the primary actuator moving assembly 46 during an ultra-fast opening operation, while the solenoid plunger 52 remains still. The optical sensor 204 is fixed in place and can be coupled to any portion of the circuit interrupter 1 that remains fixed in place, for example and without limitation, the housing 6 or a frame. In addition and as previously stated, the optical sensor 204 is disposed such that it faces the bar distal end 208 so that it can detect the position of the distal end 203 relative to the position of the optical sensor 204 at all times. The processor 210 and optical sensor 204 are in electrical communication such that the processor 210 can monitor the data sensed by the optical sensor 204. Thus, the processor 210 can detect the change in position of the bar distal end 208 from the beginning to the end of an opening stroke and determine how long the opening stroke lasts.

Figure 6A:
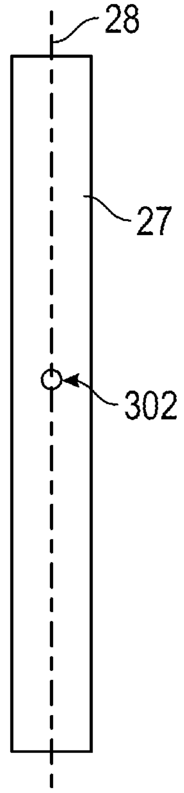
FIG. 6A shows a side view of the drive shaft of the hybrid circuit interrupter shown in FIG. 2, with a thru-hole formed in the drive shaft in order to implement a position sensitive device-based monitoring system as shown in FIG. 6B.
Figure 6B:
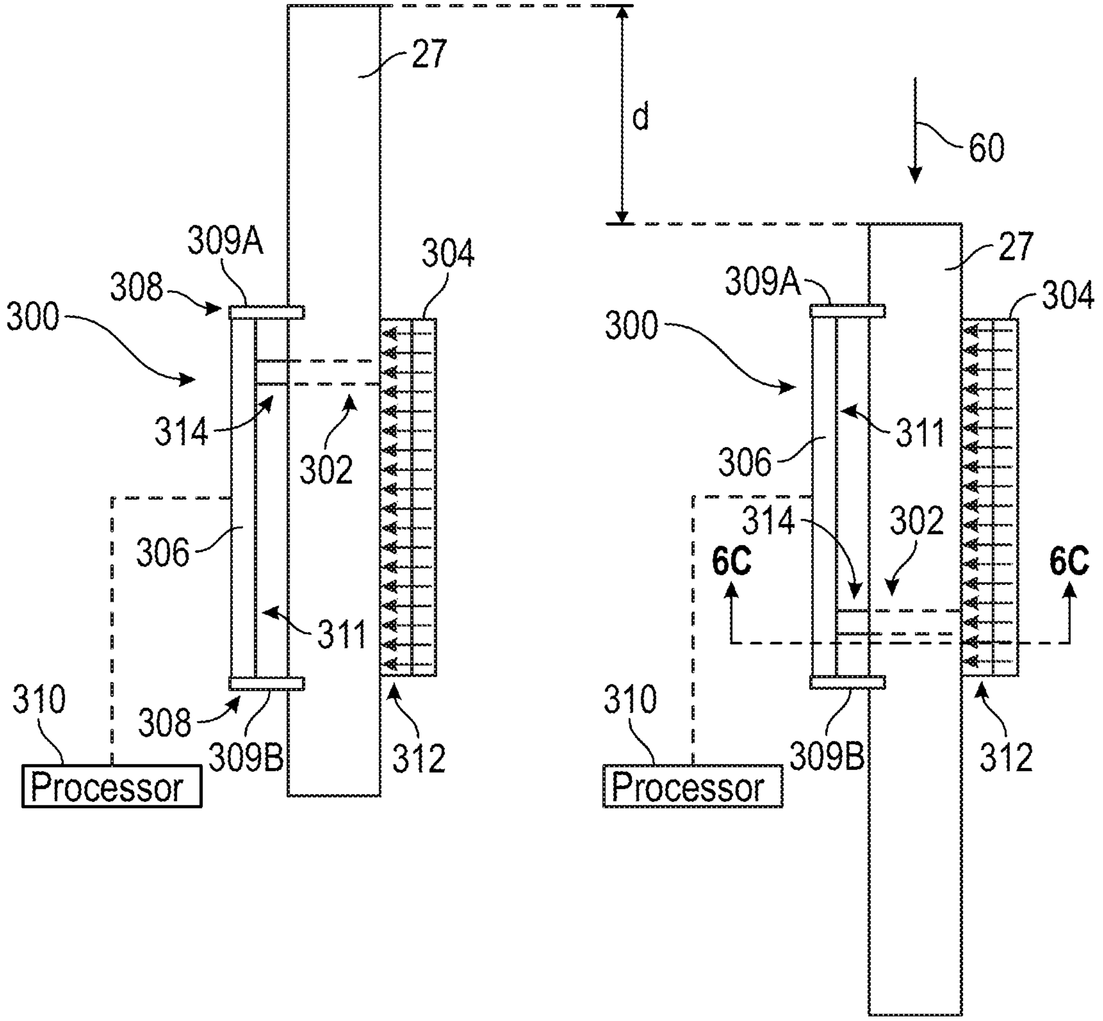
FIG. 6B shows a front view of a position sensitive device-based system mounted near the drive shaft of the hybrid circuit interrupter shown in FIG. 2 for monitoring performance of the primary actuator of the hybrid circuit interrupter, in accordance with a further example embodiment of the disclosed concept.
Figure 6C:
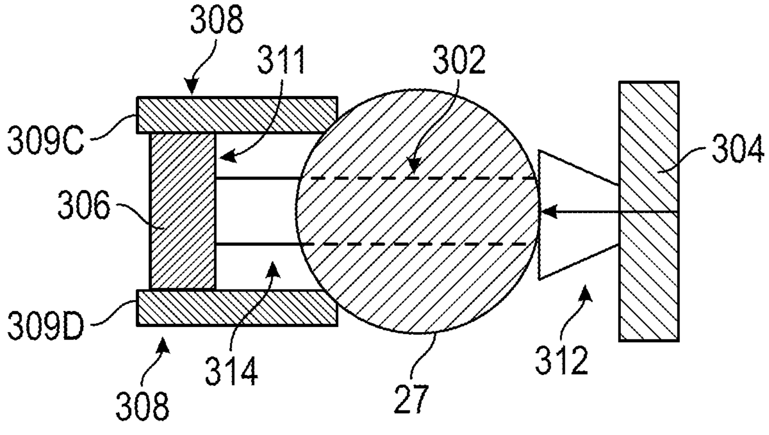
FIG. 6C shows a sectional view of the monitoring system shown in FIG. 6B, taken along the plane denoted by the line 6C-6C shown in FIG. 6B.

Referring now to FIGS. 6A-6C, various views of a position sensitive device-based (PSD-based) system 300 for monitoring the performance of the primary actuator 40 during ultra-fast opening operations is shown, in accordance with a further exemplary embodiment of the disclosed concept. FIG. 6A shows a side view of the drive shaft 27 in a viewing plane disposed perpendicularly to the front viewing plane shown in FIG. 2. When the PSD-based system 300 is implemented (the entire system 300 being shown in FIG. 6B), a thru-hole aperture 302 is formed in the drive shaft 27, as shown in FIG. 6A. The thru-hole 302 may be formed by any suitable means, such as drilling. While the thru-hole 302 is shown coinciding with the longitudinal axis 28 of the drive shaft 27, it is noted that the thru-hole is not required to coincide with the longitudinal axis 28.

Referring now to FIG. 6B, the entire PSD-based system 300 is shown, in the same front viewing plane as shown in FIG. 2. FIG. 6B depicts the drive shaft 27 having traveled a distance d in the opening direction 60. For example, the left side of FIG. 6B can represent the disposition of the PSD-based system 300 when the mechanical contacts 23, 24 are closed, and the right side of FIG. 6B can represent the disposition of the PSD-based system 300 when the mechanical contacts 23, 24 are open after the conclusion of an opening stroke. In addition to the thru-hole 302 formed in the drive shaft 27, system 300 comprises a light source 304, a position sensitive device (PSD) 306, a shade enclosure 308, and a processor 310 in electrical communication with the PSD 306. In one non-limiting example, the light source 304 can be an LED. The PSD 306 is a photosensor that can detect the position of incident light, i.e. light that is incident to a sensing surface 311 of the PSD 306.

It should be noted that the shade enclosure 308 is structured to shield the sensing surface 311 from ambient light in order to eliminate measurement error of the PSD 306, and that some portions of the shade enclosure 308 are hidden in FIG. 6B in order to reveal the PSD 306. Specifically, only a top portion 309A and a bottom portion 309B of the shade enclosure 308 are visible in FIG. 6B ("top" and "bottom" being relative to the view shown in FIG. 6B), and it should be noted that the shade enclosure 308 further comprises a front portion and a back portion that are hidden in FIG. 6B in order to reveal the PSD 306 ("front" and "back" being relative to the view shown in FIG. 6B). Referring now to FIG. 6C, which shows a sectional view of the PSD-based system 300 taken along the plane indicated by the line 6C-6C shown in FIG. 6B, the front portion 309C and the back portion 309D of the shade enclosure 308 are shown. It is noted that the top portion 309A of the shade enclosure 308 is hidden in FIG. 6C in order to better show the front and back side portions 309C and 309D, and that the top portion 309A would be located behind the front and back side portions 309C and 309D (relative to the view shown in FIG. 6C) if the top portion 309A were not hidden. In viewing FIG. 6C in conjunction with FIG. 6B, it can be appreciated that the front side portion 309C of the shade enclosure 308 extends between a first edge of the top portion 309A and a first edge of the bottom portion 309B, and that the back side portion 309D extends between a second edge of the top portion 309A and a second edge of the bottom portion 309B. The top and bottom portions 309A, 309B and the front and back side portions 309C, 309D can collectively be referred to as the sides 309 of the shade enclosure 308.

FIG. 6C shows that the front portion 309C and the back portion 309D contact a corresponding front surface and back surface (not numbered in FIG. 6C), respectively, of the PSD 306. Similarly, FIG. 6B shows that the top portion 309A and the bottom portion 309B contact a corresponding top side and bottom side, respectively, of the PSD 306. FIG. 6C further shows that the front side portion 309C and back side portion 309D are adjacent to the drive shaft 27. Similarly, FIG. 6B further shows that the top portion 309A and the bottom portion 309 B are adjacent to the drive shaft 27. It is noted that the contact between all of the shade enclosure sides 309 with the surfaces of the PSD 306 and the positioning of all of the shade enclosure sides 309 adjacent to the drive shaft 27 shield the PSD sensing surface 311 from ambient light.

Still referring to FIGS. 6B and 6C, the light source 304, PSD 306, and shade enclosure 308 are mounted so as to be stationary relative to the housing 6 of the circuit interrupter 1, and so as to be disposed linearly adjacent to the drive shaft 27, i.e. so as to ensure that the drive shaft 27 can slide linearly in the opening direction 60 in the space between the light source 304 and the PSD 306, without interference from the light source 304, PSD 306, or shade enclosure 308. While it may appear from FIG. 6B that the top and bottom portions 309A and 309B contact the drive shaft 27, and while it may appear from FIG. 6C that the front side and back side portions 309C and 309D contact the drive shaft 27, it is noted that all of the shade enclosure sides 309 are positioned to be spaced sufficiently far away from the drive shaft 27 in order to enable the drive shaft 27 to move linearly in the opening direction 60 without interference, while also being positioned adjacent and sufficiently close to the drive shaft 27 in order to minimize the exposure of the PSD sensing surface 311 to ambient light.

The drive shaft 27 is positioned between the light source 304 and the PSD 306. The light source 304 is oriented to face a first end of the thru-hole 302 (shown in FIG. 6A) in the drive shaft 27, and the PSD 306 is oriented with its sensing surface 311 facing the second end of the thru-hole 302 disposed opposite the first end. Thus, light emitted by the light source 304 can pass through the thru-hole 302 and the light source 304 can project a defined light spot onto the PSD surface 311. The thru-hole 302 is proportioned to ensure that the light passing through the thru-hole 302 is of dimensions suitable for detection by the PSD sensing surface 311. In FIG. 6B, the light emitted by the light source 304 is represented by arrows 312, and the emitted light that passes through the thru-hole 302 and is incident to the PSD sensing surface 311 is depicted as a light beam 314.

As the drive shaft 27 travels linearly in the opening direction 60, the projected light beam 314 moves linearly across the PSD sensing surface 311 in exact proportion to the movement of the drive shaft 27, which enables the PSD 306 to track the exact position of the drive shaft thru-hole 302. Because the drive shaft 27 is fixedly coupled to the primary actuator 40, the movement of the drive shaft 27 is directly proportional to the movement of the primary actuator 40 (movement of the drive shaft 27 being determined by monitoring movement of the thru-hole 302). Thus, the movement of the thru-hole 302 is a suitable proxy for the movement of the moving contact 24 during an ultra-fast opening stroke 24, and can be used to monitor the response time of the primary actuator 40 and the contact gap created during an ultra-fast opening stroke.

Signal processing circuitry suitable for processing the light signals 314 sensed by the PSD 306 must interface with the PSD 306 in order to derive the displacement of the drive shaft 27 based on the sensed position of the light signals 314. Said signal processing circuitry can either be integrated within the PSD 306 or positioned remotely within the circuit breaker housing 6 in a location where adequate space and electrical isolation is available (e.g. in the processor 310), without departing from the scope of the disclosed concept. It will be appreciated that the processor 310 is in electrical communication with the signal processing circuitry in order to track the displacement of the drive shaft 27 via the light signals 314, and that the processor 310 can accordingly determine how long an opening stroke lasts.

In addition to being low-cost to implement, the PSD-based system 300 is advantageous in several respects. First, the PSD-based system 300 does not add any mass to the drive shaft 27 and thereby does not slow down or otherwise affect actuator performance. Next, contamination of the sensing element (i.e. the PSD surface 311) by dirt or other particles is greatly minimized and virtually eliminated by the presence of the shade enclosure 308. Furthermore, as previously stated, displacement of the primary actuator moving assembly 46 during an ultra-fast opening stroke is very small (<1-2 mm) and the primary actuator 40 has a very short response time (<500 μS), and available PSDs have the ability to precisely detect displacement within these parameters.

The discussions of FIGS. 4, 5, and 6A-6C detail how the actuator performance monitoring system embodiments disclosed herein overcome several of the previously discussed challenges that must be addressed when trying to monitor the performance of a primary actuator disposed in series with a secondary actuator. In addition to the advantages already discussed, it should be noted that the performance monitoring system embodiments disclosed herein retain dielectric performance of the circuit interrupter 1 regardless of what relative voltages the vacuum interrupter terminals are referenced to. Sensors are typically ground referenced along with the actuator mechanism itself, thus making it imperative for the sensing means to provide a high dielectric strength between the sensor and the vacuum interrupter terminals. However, the actuator performance monitoring system embodiments presented herein inherently mitigate the risk of compromising the dielectric integrity between the vacuum interrupter terminals and the rest of the circuit breaker mechanism by only introducing sensor interfaces in sections of the circuit breaker mechanism that normally are also ground referenced. That is, in exemplary embodiments of the hybrid circuit interrupter 1 that include either the optical fiber-based monitoring system 100, the movement indication bar-based monitoring system 200, or the PSD-based monitoring system, the applicable sensor (i.e. either the optical sensor 104, the optical sensor 204, or the PSD 306) is referenced to the same voltage as the primary actuator 40 and the secondary actuator 50, which is typically ground voltage.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An actuator performance monitoring system for a circuit interrupter, the circuit interrupter comprising a primary actuator and a secondary actuator each being structured to open mechanical separable contacts of the circuit interrupter, the primary actuator being disposed in series with the secondary actuator such that the primary actuator is disposed between the secondary actuator and the mechanical separable contacts, the actuator performance monitoring system comprising:

an optical sensor fixedly positioned relative to a housing of the circuit interrupter;

a distance detection means disposed within the interior of the secondary actuator and structured to enable the optical sensor to determine the distance that a reference surface on the primary actuator travels during movement of the primary actuator; and a processor in electrical communication with the optical sensor, wherein the primary actuator, the secondary actuator, and the optical sensor are all referenced to the same voltage.

2. The actuator performance monitoring system of claim 1, wherein the voltage to which the primary actuator, the secondary actuator, and the optical sensor are all referenced is ground.

3. The actuator performance monitoring system of claim 1, wherein the secondary actuator comprises a solenoid plunger, wherein the distance detection means is disposed within the interior of the solenoid plunger.

4. The actuator performance monitoring system of claim 1, wherein the secondary actuator remains stationary when the primary actuator actuates an opening stroke.

5. The actuator performance monitoring system of claim 3, wherein the distance detection means comprises an optical fiber, wherein the solenoid plunger comprises an interior opening, the interior opening extending from a proximal end of the plunger to a distal end of the plunger, wherein the optical fiber is embedded within the interior opening of the solenoid plunger, wherein a proximal end of the optical fiber faces the reference surface, wherein a distal end of the optical fiber extends outside of a distal end of the solenoid plunger and connects to the optical sensor.

6. The actuator performance monitoring system of claim 3, wherein the primary actuator comprises a Thomson coil actuator comprising a Thomson coil and a moving assembly, wherein the moving assembly comprises a conductive plate structured to be actuated by the Thomson coil, an actuator shaft fixedly coupled to the conductive plate, and a sliding pin fixedly coupled to the actuator shaft, wherein the solenoid plunger comprises a slot structured to couple the actuator shaft to the solenoid plunger, wherein the sliding pin comprises a protrusion disposed in the solenoid plunger slot that movably couples the sliding pin to the solenoid plunger, wherein the primary actuator moving assembly and the solenoid plunger slot are structured such that, when the mechanical separable contacts are closed, the protrusion is adjacent to a proximal edge of the solenoid plunger slot, and when the primary actuator opens the mechanical separable contacts, the protrusion moves to a position adjacent to a distal edge of the solenoid plunger slot, wherein the solenoid plunger remains stationary when the primary actuator opens the mechanical separable contacts.

7. The actuator performance monitoring system of claim 3, wherein the distance detection means comprises a movement indication bar, wherein the solenoid plunger comprises an interior opening, the interior opening extending from a proximal end of the plunger to a distal end of the plunger, wherein a portion of the movement indication bar is disposed through the interior opening of the solenoid plunger, wherein a proximal end of the movement indication bar is fixedly coupled to the reference surface, wherein a distal end of the movement indication bar extends outside of a distal end of the solenoid plunger and faces the optical sensor.

8. The actuator performance monitoring system of claim 7, wherein the movement indication bar comprises a bar body, wherein the bar body is the portion of the movement indication bar that is disposed through the interior opening of the solenoid plunger, wherein the distal end of the movement indication bar comprises a linear member or planar surface integrally formed with and disposed perpendicularly to the bar body.

9. A hybrid circuit interrupter, the circuit interrupter comprising:

a housing;

a line conductor structured to connect a load to a power source;

a hybrid switch assembly disposed along the line conductor between the power source and the load, the hybrid switch assembly comprising:

mechanical separable contacts structured to move between a closed state and an open state, the mechanical separable contacts comprising a stationary contact and a moving contact; and an electronic interrupter structured to commutate current when a fault is detected on the line conductor;

a drive shaft operably coupled to the moving contact;

a primary actuator coupled to the drive shaft and structured to open the mechanical separable contacts at ultra-fast speeds;

an actuator performance monitoring system structured to monitor performance of the primary actuator, the actuator performance monitoring system comprising:

a light source facing the drive shaft and fixedly positioned relative to the housing;

a position sensitive device comprising a sensing surface structured to sense incident light, the sensing surface being positioned to face the drive shaft and the position sensitive device being fixedly positioned relative to the housing;

a shade enclosure fixedly positioned relative to the housing and positioned to shield the sensing surface from ambient light; and a processor in electrical communication with the position sensitive device, wherein the drive shaft comprises a thru-hole, wherein the light source faces a first end of the thru-hole, wherein the sensing surface faces a second end of the thru-hole disposed opposite the first end such that any light emitted from the light source and passing through the thru-hole will be incident to the sensing surface, and wherein the processor is configured to determine the displacement of the thru-hole resulting from movement of the drive shaft, based on the light passing through the thru-hole and incident to the sensing surface.

10. The circuit interrupter of claim 9, further comprising:

a secondary actuator disposed in series with the primary actuator and structured to open the mechanical separable contacts at normal speeds, wherein the primary actuator, the secondary actuator, and the position sensitive device are all referenced to the same voltage.

11. The circuit interrupter of claim 10, wherein the voltage to which the primary actuator, the secondary actuator, and the position sensitive device are all referenced is ground.

12. A circuit interrupter, the circuit interrupter comprising:

a housing;

a line conductor structured to connect a load to a power source;

mechanical separable contacts disposed along the line conductor and structured to move between a closed state and an open state;

a Thomson coil primary actuator structured to open the mechanical separable contacts at ultra-fast speeds, the primary actuator comprising:

a Thomson coil;

a conductive plate structured to be actuated by the Thomson coil;

an actuator shaft fixedly coupled to the conductor plate; and a sliding pin fixedly coupled to the actuator shaft;

a solenoid secondary actuator disposed in series with the primary actuator and structured to open the mechanical separable contacts at normal speeds, the secondary actuator comprising a solenoid plunger;

an electronic trip unit structured to monitor the line conductor for fault conditions and selectively actuate the primary actuator and the secondary actuator; and an actuator performance monitoring system structured to monitor performance of the primary actuator, the actuator performance monitoring system comprising:

an optical sensor fixedly positioned relative to the housing;

a distance detection means disposed within the interior of the solenoid plunger; and a processor in electrical communication with the optical sensor, wherein the distance detection means is structured to enable the optical sensor to determine the distance that a reference surface on the primary actuator travels during movement of the primary actuator.

13. The circuit interrupter of claim 12, wherein the solenoid plunger is coupled to the actuator shaft via the sliding pin.

14. The circuit interrupter of claim 12, wherein the primary actuator, the secondary actuator, and the optical sensor are all referenced to ground voltage.

15. The circuit interrupter of claim 13, wherein the secondary actuator remains stationary when the primary actuator actuates an opening stroke.

16. The circuit interrupter of claim 15, wherein the distance detection means comprises an optical fiber, wherein the solenoid plunger comprises an interior opening, the interior opening extending from a proximal end of the plunger to a distal end of the plunger, wherein the optical fiber is embedded within the interior opening of the solenoid plunger, wherein a proximal end of the optical fiber faces the reference surface, wherein a distal end of the optical fiber extends outside of a distal end of the solenoid plunger and connects to the optical sensor.

17. The circuit interrupter of claim 13, wherein the distance detection means comprises a movement indication bar, wherein the solenoid plunger comprises an interior opening, the interior opening extending from a proximal end of the plunger to a distal end of the plunger, wherein a portion of the movement indication bar is disposed through the interior opening of the solenoid plunger, wherein a proximal end of the movement indication bar is fixedly coupled to the reference surface, wherein a distal end of the movement indication bar extends outside of a distal end of the solenoid plunger and faces the optical sensor.

18. The circuit interrupter of claim 17, wherein the movement indication bar comprises a bar body, wherein the bar body is the portion of the movement indication bar that is disposed through the interior opening of the solenoid plunger, wherein the distal end of the movement indication bar comprises a linear member or planar surface integrally formed with and disposed perpendicularly to the bar body.

* * * * *